Figure 1:
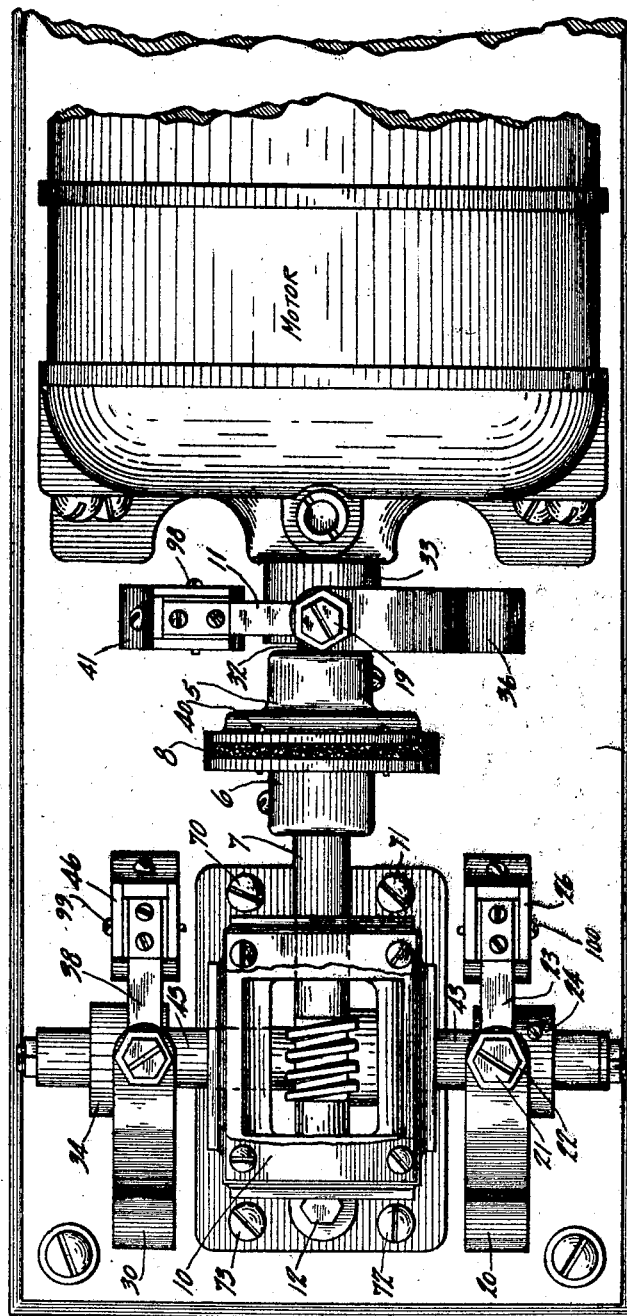

Jan. 13, 1925.  
H. F. OBERGFELL  
1,523,036  
TESTING MECHANISM FOR AUTOMATIC SWITCHES  
Filed Aug. 31, 1921 2 Sheets-Sheet 1

Inventor  
Herbert F. Obergfell  
Chas. M. Candy, Atty.

Jan. 13, 1925.  1,523,036
H. F. OBERGFELL
TESTING MECHANISM FOR AUTOMATIC SWITCHES
Filed Aug. 31, 1921   2 Sheets-Sheet 2
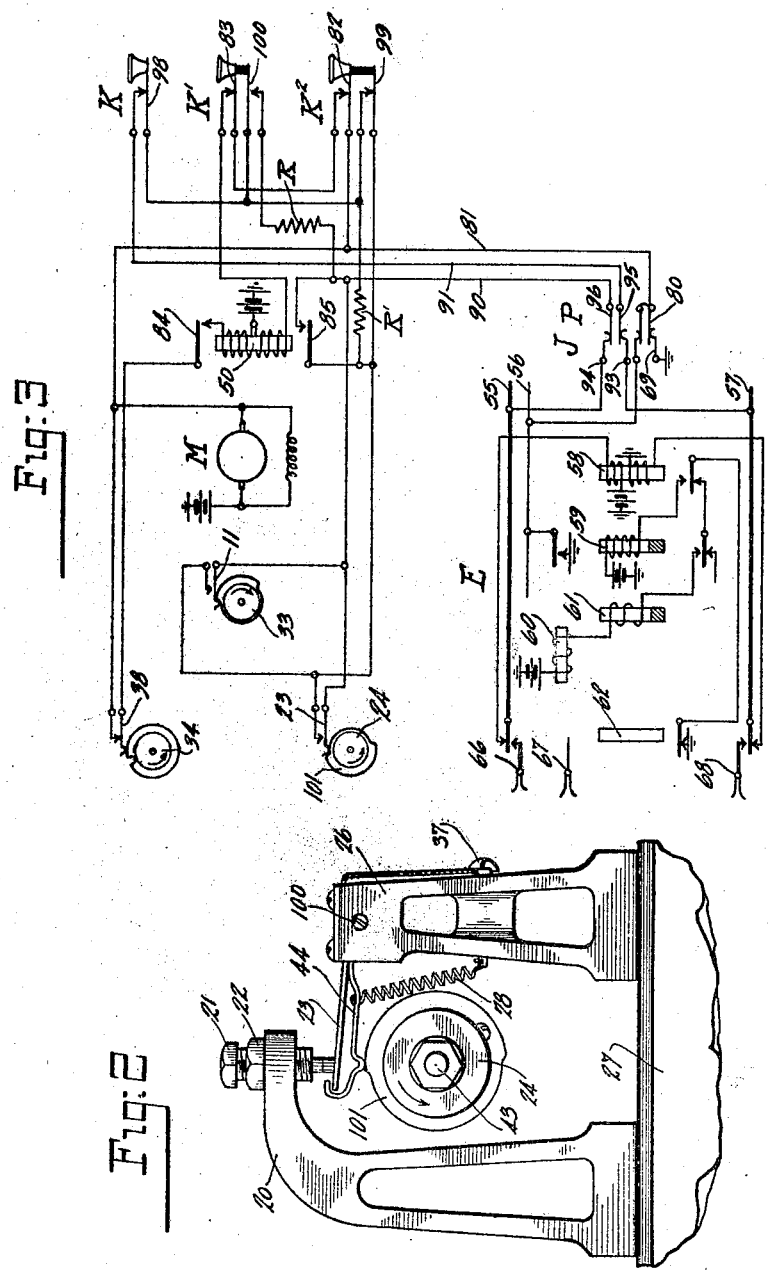
Inventor
Herbert F. Obergfell Patented Jan. 13, 1925.

1,523,036

UNITED STATES PATENT OFFICE.

HERBERT F. OBERGFELL, OF RIVER FOREST, ILLINOIS, ASSIGNOR TO AUTOMATIC ELECTRIC COMPANY, OF CHICAGO, ILLINOIS, A CORPORATION OF ILLINOIS.

TESTING MECHANISM FOR AUTOMATIC SWITCHES.

Application filed August 31, 1921. Serial No. 497,112.

*To all whom it may concern:*

Be it known that I, HERBERT F. OBERGFELL, a citizen of the United States of America, and a resident of River Forest, Cook County, and State of Illinois, have invented certain new and useful Improvements in Testing Mechanisms for Automatic Switches, of which the following is a specification.

The present invention relates in general to testing mechanisms for automatic switches, or devices which are commonly known as varying machines.

More specifically, the present invention has for its principal object the construction of an improved varying machine for use in testing automatic switches which are adapted to respond to series of impulses. As is well understood, a machine of this character is used in testing the switches in order to provide a safe margin of operation. When a switch is to be tested the varying machine is connected to it by means of a plug. The operator or tester then manipulates certain keys whereby a series of impulses is sent to the line relay of the switch through various resistances and line leakages in order to properly margin the switch so that it will operate satisfactorily under all conceivable working conditions; that is, a series of impulses from this machine is sent over a line having much greater resistance and leakage than is usually encountered in practice and the switch is adjusted to function properly.

Another object of the invention is to provide an improved circuit arrangement for a varying machine of this kind.

Referring now to the drawings, Fig. 1 shows a top view of the improved varying machine proper. Fig. 2 shows a detail of a bracket arrangement for mounting the impulsing or other springs together with their controlling cam. In Fig. 3 is shown the circuit of the varying machine, and at E is diagrammatically represented the circuit of a selector switch with enough of the circuit shown to illustrate the operation.

The operation and construction of the improved varying machine will now be described with reference to Figs. 1 and 2. Like parts in the various figures have been given like reference characters in order to facilitate the explanation. The varying machine proper comprises a small motor of any desired type which is adapted to rotate its shaft 32 at a speed of 840 revolutions per minute or 14 a second. The motor is mounted in place on a slate base 27 by means of screws. Fastened on the shaft 32 is a sleeve 33 upon which is mounted a cam, the latter being adapted to operate the spring 11 and cause it to disengage from the screw 19 once every revolution. The spring 11 and the screw 19 are fastened to the brackets 41 and 36 which are assembled on the slate base. The spring 11 and the screw 19 constitute the impulse springs of the varying machine and interrupt the line circuit in order to send out series of testing impulses. The shaft 32 is joined to the shaft 7 by means of a flexible joint of the usual construction, which comprise the two flanged sleeves 6 and 5 attached to the shafts 7 and 32 and joined to the leather washer 8 by means of screws such as 40 in the usual manner. It will be seen that this construction forms a flexible joint and at the same time the leather washer 8 serves to insulate the shaft 7 and the shaft of the motor from each other. This provision is made so that if a short circuit occurs or any foreign potential is on the motor, this will not be conducted to the shaft 7. A gear housing 10 contains a worm gear of the usual construction through the medium of which the motion of the shaft 32 is transmitted to the shaft 43. The ratio of gearing between the shafts 32 and 43 is twenty to one; that is, the shaft 32 is adapted to make twenty revolutions while the shaft 43 is making one. The shaft 43 carries the two sleeves 24 and 34 upon which are attached two cams, one on each sleeve, these in turn controlling the springs 23 and 38 in the same manner as the spring 11 is controlled by the impulse cam mounted on the sleeve 33. The brackets 30 and 46, and 20 and 26 are fastened to the slate base 27 in the same manner as the brackets 36 and 41. The springs 11, 23, and 38 are mounted on small metal blocks which are pivoted in their associated brackets by means of the screws 98, 99 and 100, respectively. The gear housing 10 is adapted to be supplied with oil through the cup 12. A clearer understanding of the construction of the brackets which hold the springs such as 11, 23 and 38 in place and of the manner in which these springs are pivoted and adapted to be controlled by their respective cams, may be obtained with reference to Fig. 2. As mentioned before, the brackets 20 and 26 are mounted in the slate base 27 by means of screws (not shown). The bracket 20 carries the screw 21 which forms one contact of impulse short circuiting springs. On bracket 26 is pivoted by means of the screw 100 a small metal block carrying the spring 23 and its controlling spring 44 to which one end of the coil spring 28 is fastened. The other end of the spring 28 is fastened to the screw 37 which forms one terminal in the circuit of the machine. As the cam rotates, the spring 23 remains in engagement with the screw 21 by its own tension all the while the raised portion of the cam maintains the controlling spring 44 out of engagement with it. However, as soon as the shaft rotates far enough, the raised portion of the cam disengages the spring 44 and allows it to operate the spring 23 and causes the latter spring to break away from the screw 21. This construction of these springs make the varying machine very efficient in operation always giving a positive operation of the springs. The contact screw 21 is adapted to be adjusted and locked in position by means of the lock nut 22. In a manner similar to the above, the brackets 36 and 41, and 30 and 46 are constructed and hold the springs 11 and 38 in position to be operated by the cams mounted on the sleeves 33 and 34. As all the springs are mounted on brackets which are fastened to the slate base 27, they are all insulated from each other and the possibility of a short circuit occurring is minimized. The various springs such as 11, 23, and 38 may be very readily replaced when it is desired by merely removing the pivot screws such as 98, 100 and 99 from the metal blocks upon which are mounted the springs and taking out the whole spring assembly; thus the springs may be replaced or adjusted.

The operation of the improved varying machine will now be described with reference to Fig. 3. For this purpose it will be assumed that it is desired to vary the selector E. In order to do this the operator or tester will insert the plug P, attached to the flexible cord of the varying machine, into the switch jack J of the selector E. When this occurs, ground is placed upon the release trunk conductor 56 so as to prevent this switch from being seized while the tester is testing it. By the insertion of the plug P into the jack J another circuit is completed which extends from ground by way of jack spring 69, spring 80, conductor 81, and through the field and armature windings of the motor M to battery. The motor M immediately begins to rotate and operates the impulse cam and the two other cams carried on the sleeves 33, 24 and 34, respectively. The operation of these cams is without function until the tester manipulates a certain one of the keys $K'$, or $K^2$. Still another circuit is completed in multiple with that of the motor M which extends from grounded conductor 81, spring 82 of key $K^2$ and its resting contact, spring 83 of key $K'$ and its resting contact, and through the lower winding of the relay 50 to battery. Relay 50 is immediately energized over this circuit and, upon operating, at armature 85 places a short circuit across the line conductors 90 and 91 of the cord extending to the selector E, and at armature 84 establishes a locking circuit for itself provided the trip spring 38 is not out of engagement with its working contact. The trip cam mounted on the sleeve 34 determines when the testing impulses are effective to operate the selector E after one of the keys $K'$ or $K^2$ has been operated. The cam mounted on sleeve 24 determines how many impulses are sent to the selector E. As soon as the relay 50 energizes, the circuit of the line relay 58 of the selector E is completed over the following path: ground through the lower winding of the line relay 58, back contact and lower armature of relay 62, jack spring 93, spring 95 of plug P, conductor 91, resting contact of spring 98 of key K and the said spring, resting contact of spring 99 of key $K^2$ and the said spring, armature 85 and its front contact, conductor 90, spring 96 of plug P, spring 94 of the jack J, upper armature and back contact of relay 62 and thence through the upper winding of the line relay 58 to battery. The relay 58, upon energizing, at its lower armature completes the circuit of the slow acting relay 59. The latter relay, upon energizing, prepares the operating circuits of the selector E at its lower armature and at its upper armature places ground upon the release trunk conductor 56. The latter operation is without function in the present instance.

Returning now to the operation of the varying machine proper, in order to test the switch the tester operates one of the keys $K'$ or $K^2$. It will be first assumed that he operates the key $K'$. By this operation the circuit of the lower winding of the relay 50 is opened at spring 83. Now when the cam on the sleeve 34 is rotated far enough the spring 38 disengages its working contact and opens the circuit of the upper winding of relay 50. Relay 50 immediately deenergizes and opens the previously traced circuit of the line relay 58 of the selector E. In the meantime, there is another circuit for the line relay 58 of the selector E, which extends from conductor 91 of the varying machine cord, resting contact of spring 98 and the said spring, resting contact of spring 99 and the said spring, working contact of spring 11 and the said spring to conductor 90. By the operation of spring 100 of key $K'$ a high resistance R is bridged directly across the above circuit. It will be seen that the circuit for the line relay 58 includes the impulse spring 11 controlled by the impulse cam. Now as the motor continues to rotate the cam mounted on the sleeve 33, the circuit of the line relay 58 is opened a plurality of times, though high resistance R remains bridged across the circuit. The drawing shows the various cams just at the beginning of the series of impulses. The line relay 58 is now adjusted to operate the selector E satisfactorily under these conditions by adjusting the tension of its springs and by varying the stroke and residual of the armature. The circuit of the line relay 58 is opened nine times. As soon as these nine impulses have been sent to the selector E, the cam on the sleeve 24 causes the spring 23 to be operated into engagement with its working contact. By this operation the impulse spring 11 is short circuited and rendered ineffective to control the line relay 58. Upon the cessation of impulses to the selector E the operation of the line relay ceases, and the operator will restore the key K' to normal. Nine impulses are sent to the selector because this number allows the tester to see how the switch operates and fully tests the switch.

In the selector E, the line relay 58 with each retraction of its armature, sends an impulse of current through the vertical magnet 60 in series with the slow acting relay 61. The vertical magnet 60 operates to raise the switch shaft carrying the wipers 66—68, inclusive, step by step until they are placed opposite the ninth level of bank contacts. The slow acting relay 61 is energized in series with the vertical magnet and controls certain circuits in the selector E in a well known manner. It will be remembered that the impulsing circuit of the line relay 58 was bridged by a high resistance R while the impulses were being sent. This, of course, tends to make the relay 58 slow to deenergize and quicker to energize thereby sending shorter impulses of current to the vertical magnet 60. However, as before mentioned, the tester adjusts the switch to operate under these conditions, that is, the operator will try various adjustments on the line relay 58 until the selector operates satisfactorily with the key K' pressed. It has been found in practice that to make the resistance R of 20,000 ohms gives a very satisfactory margin of operation. The selector E is released each time by the operation of the key K which opens the line circuit of the line relay 58 and causes the release of the selector E in the usual manner.

After the selector E has been adjusted to operate with the key K' pressed, the tester will try its operation with the key K² operated. With the key K² operated, the circuit of the line relay 58 includes the resistance R' in series with it. Now when the circuit of the line relay is opened, by the operation of the impulsing cam mounted on the sleeve 33 the resistance R in series with the circuit of the line relay has a tendency to cause the line relay to deenergize more quickly and energize more slowly thereby causing a longer impulse of current to be sent to the vertical magnet and at the same time maintaining the circuit of the slow relay 59 open longer between impulses. The tester now adjusts the selector E to operate with the key K² pressed. It has been found that to make the resistance R' of 1200 ohms gives a satisfactory operating margin. The operator now adjusts the selector E to operate between these two extremes, that is, the selector E must function properly with either the key K' and K² pressed or both of them together. When both the keys K' and K² are pressed the impulsing circuit of the line relay 58 has a resistance R' in series with it and also has the resistance R bridged across it. It will be seen that by adjusting the selector to operate under these extreme conditions that a safe margin of operation is provided.

It will be obvious that when it is desired to test a connector switch which has both a directively controlled rotary movement as well as vertical it is only necessary to maintain the keys K' or K² pressed until two series of impulses are sent. That is, the impulsing cam operates to send 9 impulses and then there is a pause, during which the short circuiting cam is operated and 11 impulses are shorted, after this nine more impulses are sent. Obviously ten impulses or any other number could be sent by altering the shape of the impulse short circuiting cam.

The features of the invention having been described and ascertained what is considered to be new and desired to have protected by Letters Patent will be pointed out in the appended claims.

What I claim as my invention is:

1. In an automatic switch testing mechanism, a motor having a rotatable shaft, a cam mounted thereon, springs adapted to be operated by said cam, an automatic switch, a line relay therefor, a circuit for said line relay controlled by said springs, means for operating said motor to cause said cam to actuate said springs, a second cam controlled by said motor for rendering the operation of said springs effective to interrupt the circuit of said line relay, a high resistance, and a manually operated key for directly connecting said resistance in shunt across the circuit of said line relay.

2. In an automatic switch testing mechanism, a motor having a rotatable shaft, a cam mounted thereon, springs adapted to be operated by said cam, an automatic switch, a line relay therefor, a circuit for said line relay controlled by said springs, a second circuit for said line relay, means for operating said motor to actuate said springs through the medium of said cam, a second cam controlled by said motor for opening said second circuit to render the operation of said springs effective to interrupt the circuit of said line relay, a high resistance, and a manually operated key for directly connecting said resistance in series with said line relay.

3. In an automatic switch testing mechanism, a motor having a rotatable shaft, a cam mounted thereon, springs operated by said cam, an automatic switch, a line relay therefor, a circuit for said line relay controlled by said springs, a second relay, a circuit for energizing said second relay, means controlled by said second relay for completing a second circuit for said line relay, a resistance, a manually operated key for opening the circuit of said second relay thereby causing said second relay to open said second circuit to cause said springs to produce a series of interruptions in the circuit of the line relay, said key also directly operative to bridge said resistance across the circuit of said line relay.

4. In an automatic switch testing mechanism, a motor having a rotatable shaft, a cam mounted thereon, springs operated by said cam, an automatic switch, a line relay therefor, a circuit for said line relay controlled by said springs, a second relay, a circuit for energizing said second relay, means controlled by said second relay for completing a second circuit for said line relay, a resistance, a manually operable key directly operative to open the circuit of said second relay thereby causing said second relay to open said second circuit to cause said springs to produce a series of interruptions in the circuit of the line relay, said key also directly operative to place said resistance in series with the circuit of said line relay.

5. In an automatic switch testing mechanism, a motor having a rotatable shaft, a sleeve mounted on said shaft carrying a cam, springs operated by said cam, a second shaft, reduction gearing for transmitting the motion of said first shaft to said second shaft, a second set of springs, an automatic switch, a line relay therefor, a circuit for said line relay including said first springs, a second circuit for said line relay including said second springs, means for operating said motor thereby causing the operation of said first springs by means of said cam, and means on said second shaft for opening said second springs to render such operation effective to interrupt the circuit of said line relay.

6. In an automatic switch testing mechanism, a motor having a rotatable shaft, a sleeve mounted on said shaft carrying a cam, springs operated by said cam, a second shaft, reduction gearing for transmitting the motion of said first shaft to said second shaft, another cam mounted on said second shaft, an automatic switch, a line relay therefor, a circuit for said line relay including said springs, a second circuit for said line relay controlled by said other cam, means for operating said motor thereby causing the operation of said springs, and means controlled by the other cam operative at a predetermined time to open said second circuit to render such operation effective to interrupt the circuit of said line relay.

7. In an automatic switch testing mechanism, a motor having a rotatable shaft, a sleeve mounted on said shaft carrying a cam, springs adapted to be operated by said cam, a second shaft, means for transmitting the motion of said first shaft to said second shaft, two cams mounted on said second shaft, an automatic switch, a line relay therefor, a circuit for said line relay including said springs, a second circuit for said line relay controlled by one of said two cams, means for operating said motor thereby causing the operation of said springs, means controlled by said one of the two cams for opening said second circuit to render such operation effective to interrupt the circuit of said line relay, and means controlled by the other of said two cams for rendering such operation ineffective after a predetermined time to interrupt the circuit of said line relay.

8. In an automatic switch testing mechanism, a motor having a rotatable shaft, a sleeve mounted on said shaft carrying a cam, springs operated by said cam, a second shaft, worm gearing for transmitting the motion of said first shaft to said second shaft, two cams mounted on said second shaft, an automatic switch, a line relay therefor, a circuit for said line relay including said springs, a second circuit for said line relay controlled by one of said other cams, means for operating said motor thereby causing the operation of said springs, means controlled by said one of said other cams for opening said second circuit to render such operation effective to interrupt the circuit of said line relay, and means controlled by the other of said other cams for rendering such operation ineffective to interrupt the circuit of said line relay after a certain number of interruptions have been produced in the circuit of said line relay.

9. A varying machine for testing automatic switches comprising an impulse circuit, a set of springs for transmitting impulses over said circuit, a set of shunt springs for rendering said first springs ineffective at intervals, thereby producing groups of impulses, and two motor driven cams for controlling said two sets of springs, respectively.

10. A varying machine for testing automatic switches comprising an impulse circuit, a set of springs for transmitting impulses over said circuit, a set of shunt springs for rendering said first springs ineffective at intervals, thereby producing groups of impulses, two motor driven cams for controlling said two sets of springs, respectively, a resistance, and a manually operable key for bridging said resistance across said circuit.

11. A varying machine for testing automatic switches comprising an impulse circuit, a set of springs for transmitting impulses over said circuit, a set of shunt springs for rendering said first springs ineffective at intervals, thereby producing groups of impulses, two motor driven cams for controlling said two sets of springs, respectively, a resistance, and a manually operable key for connecting said resistance in series in said circuit.

12. A varying machine for testing automatic switches comprising an impulse circuit, a set of springs for transmitting impulses over said circuit, a set of shunt springs for rendering said first springs ineffective at intervals, thereby producing groups of impulses, two motor driven cams for controlling said two sets of springs, respectively, resistance, a manually operable key for connecting said resistance in series in said circuit, a second resistance, and a second key manually operable at the same time as said first key to connect said second resistance in bridge of said circuit.

13. A varying machine for testing automatic switches comprising an impulse circuit, a set of springs for transmitting impulses over said circuit, a set of shunt springs for rendering said first springs ineffective at intervals, thereby producing groups of impulses, two motor driven cams for controlling said two sets of springs, respectively, and a manually operable key for opening said impulse circuit at will.

14. A varying machine for testing automatic switches comprising an impulse circuit, a set of springs for transmitting impulses over said circuit, a set of shunt springs for rendering said first springs ineffective at intervals, thereby producing groups of impulses, two motor driven cams for controlling said two sets of springs, respectively, a motor for driving said cams, means for connecting said impulse circuit to a switch which is to be tested, and means for automatically starting said motor when the connection is established.

15. A varying machine for testing automatic switches comprising an impulse circuit, means for connecting said circuit with a switch to be tested, a motor driven cam and a set of interrupter springs for producing interruptions in said circuit, a second cam, a manual key, and a relay for shunting said springs jointly controlled by said cam and key.

16. A varying machine for testing automatic switches comprising an impulse circuit, means for connecting said circuit with a switch to be tested, a motor driven cam and a set of interrupter springs for producing interruptions in said circuit, a relay energized when the connection is established and having contact springs for shunting said interrupter springs, a locking circuit for said relay, a key for opening the initial energizing circuit of said relay, a second cam for shunting said interrupter springs at intervals to produce groups of interruptions, and a third cam for opening said locking circuit at the beginning of a group of interruptions.

17. A varying machine for testing automatic switches comprising a motor, an impulse circuit, means for connecting said impulse circuit to an automatic switch to be tested, a motor circuit automatically completed when the connection is established, a cam driven by said motor for transmitting impulses over said impulse circuit to said switch, a second cam driven by said motor, a manually operable key, and means jointly controlled by said second cam and said key for delaying the transmission of impulses.

18. In an automatic switch testing mechanism, a motor having a rotatable shaft, interrupter springs, a cam mounted on said shaft for operating said springs, another shaft geared to said first shaft, a cam mounted on said second shaft, a circuit for an automatic switch including said springs, a second circuit for said switch including other springs controlled by the cam on said second shaft, means for causing said motor to operate and to thereby cause said cams to operate said springs, one of said cams causing one of said circuits to be interrupted for long intervals and the other of said cams causing the other of said circuits to be interrupted a plurality of times during a single interruption of the first circuit.

In witness whereof, I hereunto subscribe my name this 27th day of August, A. D., 1921.

HERBERT F. OBERGFELL.